Heil

[11] Patent Number: 4,671,314
[45] Date of Patent: Jun. 9, 1987

[54] FLOW LINE SAMPLER VALVE APPARATUS

[76] Inventor: John S. Heil, P.O. Box 1361, Pascagoula, Miss. 39567

[21] Appl. No.: 826,731

[22] Filed: Feb. 6, 1986

Related U.S. Application Data

[63] Continuation of Ser. No. 511,328, Jul. 5, 1983, abandoned, which is a continuation-in-part of Ser. No. 335,768, Dec. 30, 1981, abandoned.

[51] Int. Cl.⁴ .......................................... F16K 49/00
[52] U.S. Cl. ............................... 137/340; 251/145; 251/345; 251/176; 251/310; 222/553
[58] Field of Search .............. 251/145, 146, 288, 345, 251/352, 353, 176, 310; 137/312, 313, 340, 341, 381; 222/108, 531, 545, 548, 553

[56] References Cited
U.S. PATENT DOCUMENTS

| 770,825 | 9/1904 | Schroeder | 251/353 |
| 848,088 | 3/1907 | Desrosiers | 137/313 |
| 1,015,675 | 1/1912 | Gergely | 222/548 |
| 1,154,163 | 9/1915 | Ballou | 222/545 |
| 2,061,462 | 11/1936 | Groman | 222/545 |
| 3,028,874 | 4/1962 | Burkett | 137/340 |
| 3,410,303 | 11/1968 | Johnson, Jr. | 137/381 |
| 3,417,780 | 12/1968 | Lienard | 251/146 |
| 3,751,003 | 8/1973 | Kass | 251/312 |
| 3,916,940 | 11/1975 | Allen | 137/340 |
| 4,161,959 | 7/1979 | Jansen et al. | 137/340 |
| 4,410,002 | 10/1983 | Schuurman | 137/340 |
| 4,421,297 | 12/1983 | Pongrass et al. | 251/345 |
| 4,510,966 | 4/1985 | Parsons, Jr. | 251/312 |

Primary Examiner—Martin P. Schwadron
Assistant Examiner—Sheri M. Novack
Attorney, Agent, or Firm—Pravel, Gambrell, Hewitt & Kimball

[57] ABSTRACT

A homogeneous fluid sampling valve mounted into a high pressure or low pressure flow line or the like wherein homogeneous fluid is flowing therein, preferably the body of the valve mounted perpendicular to the flow with a small portion of the valve body extending into the flow line. There is further provided a bore through a conduit in the valve body for transporting fluid from the main flow line through the valve body and exterior to the valve. The valve body is further provided with an extended stem wherein there is rotatably mounted a thickened collar member having a spout in fluid communication with the bore when the collar member is placed in the open position and in fluid tight engagement with the valve body when the collar member is rotated to the closed position by a stationary sealing wafer. The collar member is maintained in fluid-tight engagement against the end of the valve body against the bias of a spring member engaged on the stem member. The collar member is further rotated by means of a handle threadably engaged to the collar member from open to closed position via a recessed area in the stem.

12 Claims, 6 Drawing Figures

FLOW LINE SAMPLER VALVE APPARATUS

This is a continuation of application Ser. No.: 511,328 filed July 5, 1983 presently pending, which is a continuation-in-part of application Ser. No. 335,768, filed Dec. 30, 1981, now abandoned.

BACKGROUND OF THE INVENTION

1. Field of the Invention

The present invention relates to sampler valves. More particularly, the present invention would relate to a sampler valve set perpendicular within a flow line to sample a specified amount of homogeneous fluid flowing within the line.

2. General Background

In the operation of chemical process plants or the like, or in the start-up of such plants, it is imperative that the materials used in the chemical processes be of the proper purity and strength as required in the processes. One means of assuring that this is accomplished is to take periodic samples of various chemical components utilized in the plant, and to run tests to assure that they are in line with the standards as established for the effectiveness within the plant.

In the case of homogeneous fluids which must be chemically intermixed or reacted to carry on the processes, the most effective means of establishing the purity of the flow within the line is to obtain a sample of the fluid within the line during the flow, so that a representative sample of the fluid within the line is obtained.

Obtaining reliably representative samples on a routine basis from chemical plant process streams is a long standing problem of the industry. Various solutions to eliminate specific sampling problems of difficult to handle process stream have been successfully approached but little or no attention has been devoted to insure accurate sampling of homogeneous liquid.

Accurate reliable sampling can save thousand of dollars daily during start up, shutdown and continuous operations. Repeat sampling to ensure reliability of the samples taken can be completely avoided by utilizing a minimum volume apparatus.

Typical sample systems are normally comprised of a common gate or globe valve ½" to 1" in diameter with the associated pipe nipples for connection to the process piping. The valves usually serve the purpose of draining lines and sampling is a convenient secondary use.

One major problem associated with this system is the large internal volume which requires one to two gallons of flushing to remove old material trapped in the pipes and valves. Even flushing large volumes of material does not insure complete purging of dead zones, or no flow areas in the sampling system. Therefore, sample reliability is always suspect. In addition, valve packings, O-rings, and gaskets also adsorb organic chemicals which also make samples suspect especially where trace analysis is required. Standard valves generally have periodic re-occurring leak problems which are not addressed in the present state of the art.

There are several patents which teach the use of sampler valves in various operations, the most pertinent being as follows:

U.S. Pat. No. 2,012,836 issued to Talbet et al entitled "Sampling Device" would teach the use of a device which is suited for sampling the waxy oil stream through pipe lines, generally comprising an open cup portion within the housing adapted to hold a continuously changing sample of liquid, and a conduit which leads into the cup projecting through the wall of the housing for gravitating the liquid from the cup. There is further provided a valving mechanism for controlling the gravitation of the liquid therefrom.

U.S. Pat. No. 3,260,120 issued to D. W. Stillwell entitled "Sampling Device" would teach the use of an apparatus for sampling from a stream during the sampling process. This particular apparatus is adapted especially for sampling polyolefin pellets with the according structure thereof.

U.S. Pat. No. 3,747,411 issued to McDermitt et al entitled "Suspension Sampling" would teach the use of a sampling apparatus designed for taking at regularly timed intervals samples of slurries as they are passed through a pipe line. In this particular apparatus, there is provided the insertion of a sampling tube into the pipe for removal of the portion.

U.S. Pat. No. 631,549 issued to F. Talcott and F. J. Daubenberger entitled "Milk Sampler" would teach the use of a sampling apparatus for sampling milk.

U.S. Pat. No. 3,267,735 issued to M. L. Fickle entitled "Fluid Sampling Valve" would teach the use of a rotative disc bleeder valve having a valve seat discharge passage threaded section and an enlarged section and an operating shaft for rotatably mounting the plug for allowing bleeding fluid therethrough.

U.S. Pat. No. 3,476,138 issued to Doremus, et al, entitled "Valve With Stop And Washout" relates to a valve for dispensing fluids, such as beer from a keg. The main function of this valve is to provide a washout slot so that the keg can be readily cleaned. There is provided a stop mechanism for the rotatable valve member, the slot also serving to wash out an extension member located on the valve body. This valve does not address the use of the valve for sampling homogeneous high pressure corrosive fluids.

Russian Pat. No. 397,803 issued to Tomacob shows the use of a pipe line liquid sampler using a perforated tube mounted perpendicular to the flow axis for averaging the samples. However, it should be noted, as seen in the drawings, that the perforations for the sampling tube receive the flow directly, and therefore do not necessarily receive a homogeneous sample. The port for receiving the flow within the present apparatus is perpendicular to the flow. In addition, the same structure is not taught in this particular patent.

GENERAL DISCUSSION OF THE PRESENT INVENTION

A sample valve with an internal volume of 0.10 to 1.0 milliliter designed specifically for sampling routine high pressure homogeneous liquid process stream can and does eliminate all associated problems and provides a completely reliable sample every time with no sample flushing required.

A 100 milliliter sample, which is normally sufficient size for most modern analytical procedures, can be drawn from the one milliliter valve and will contain 1% of material originally in the dead space. A 0.1 milliliter volume valve produces 0.1% of residual material.

These dilutions are generally acceptable for most routine samples.

Since the low volume construction of the valve provides plug flow, a few milliliters of purging will produce a sample 100% representative of the instantaneous process flow. This is particularly valuable for sampling extremely high purity product streams requiring trace analysis of impurities.

Minimum volume sampling provides a totally reliable sample, completely eliminates duplicate laboratory analyses necessary from poor sampling systems, eliminates costly process changes and off specification product caused by erroneous samples, minimizes disposal of sample purge volume and provides complete safety for personnel taking samples of toxic or corrosive materials.

Minimum volume sampling saves money, eliminates pollution and protects invaluable personnel by use of the sample apparatus described. An additional valuable benefit of this particular apparatus is the fact that there is provided superior strength, reduction in potential leakage due to the sealing effect between the wafer and the valve body, and a method for totally isolating the valve if indeed leakage should occur when not in use.

The present invention would solve the problems encountered in the present state of the art in a simple and effective manner. What is provided is a homogeneous fluid sampling valve mounted into a high pressure or low pressure flow line or the like wherein homogeneous fluid is flowing therein, preferably the body of the valve mounted perpendicular to the flow with a small portion of the valve body extending into the flow line. There is further provided a bore through the valve body for transporting fluid from the main flow line through the valve body and exterior to the valve. The valve body is further provided with an extended stem wherein there is rotably mounted a thickened collar member having a spout in fluid communication with the bore then the collar member is placed in the open position and in fluid tight engagement with the valve body when the collar member is rotated to the closed position. The collar member is maintained in fluid-tight engagement against the end of the valve body against the bias of a spring means engaged on the stem member. The collar member is further rotated by means of a handle threadably engaged to the collar member and allowing movement of the collar member from open to closed positions via a recessed area in the stem.

An additional embodiment of the apparatus provides that the main valve body be hollowed out, with the fluid stream running from the main valve line to the valve spout via a fluid line extending through the plenum chamber within the valve body, with a second fluid, such as water, being allowed to enter the plenum chamber through one port and exit through a second port thus effecting a heat exchange area within the valve body. Depending on the usage of the valve, when in fact the sample is under very high temperatures, the fluid flowing through the plenum chamber would be cold to extract heat from the overheated sample, or in the event that the stream in the sample would want to be heated, a fluid such as steam or the like could be channeled through the plenum chamber for heating the chemicals to be sampled in the fluid stream.

Therefore, it is an object of the present invention to provide a sampler valve apparatus for sampling a homogeneous fluid flowing under pressure from a main flow line.

It is a further object of the present invention to provide a sampler valve which allows obtaining a representative sample of flowing fluid through a high pressure flow line, with a minimum of impurities.

It is still a further object of the present invention to provide a sampler valve which significantly reduces the possibility of contamination within the valve itself.

It is still a further object of the present invention to provide a sampler valve having a predetermined volume of flow within to prevent the necessity of purging the valve prior to obtaining sampling of the fluid.

It is still a further object of the present invention to provide a sampler valve which presents a maximum of safety for personnel operating the valve at a minimum of exposure to toxic or corrosive fluids within the valve.

It is a further object of the present invention to provide a sampler valve with simple rotation of a valve collar member operates the valve between open and closed positions during the sampling process.

It is yet a further object of the present invention to provide a sampling valve which is easily mountable within a flow line and may be mounted in different areas of the flow line with a minimum of problems.

It is yet a further object of the present invention to provide a sampling valve having a heat exchanger within the body of the valve for removal of heat from the valve flow line.

It is yet a further object of the present invention to provide a sampling valve having a removable handle and spout to allow complete isolation and enclosure with the use of a simple threaded cap.

In order to accomplish the aforesaid objects of the present invention, it is a feature of the apparatus of the present invention to provide a sampler valve which is mounted perpendicular to the flow within the wall of a flow line.

It is a further feature of the apparatus of the present invention to provide a sampler valve having a rotatably mounted collar member which is sealably engaged against the body of the valve.

It is still a further feature of the present invention to provide a sampler valve wherein there is provided stop means for effectuating complete closure or complete opening of the valve during the sampling process.

It is still a further feature of the apparatus of the present invention to provide a sampler valve which provides a flow bore which contains a predetermined amount of liquid therein.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and, wherein.

DETAILED DESCRIPTION OF THE PREFERRED EMBODIMENT

In summary, the apparatus of the present invention would be a valve for sampling homogeneous fluids within a flow line which would comprise a valve body having a bore therethrough in fluid communication with the flow line for receiving fluid flow from the flow line. It would further comprise valving means mounted on the valve body, movable from a first or open position allowing fluid communication between the valve body and the valving means and a second or closed position blocking fluid communication. There would also be means for creating a fluid-tight seal between the valve body and the valving means when the valving means is in the second position and a port means for allowing fluid flow from the valving means when the valving means is in the first position.

Figure 1:
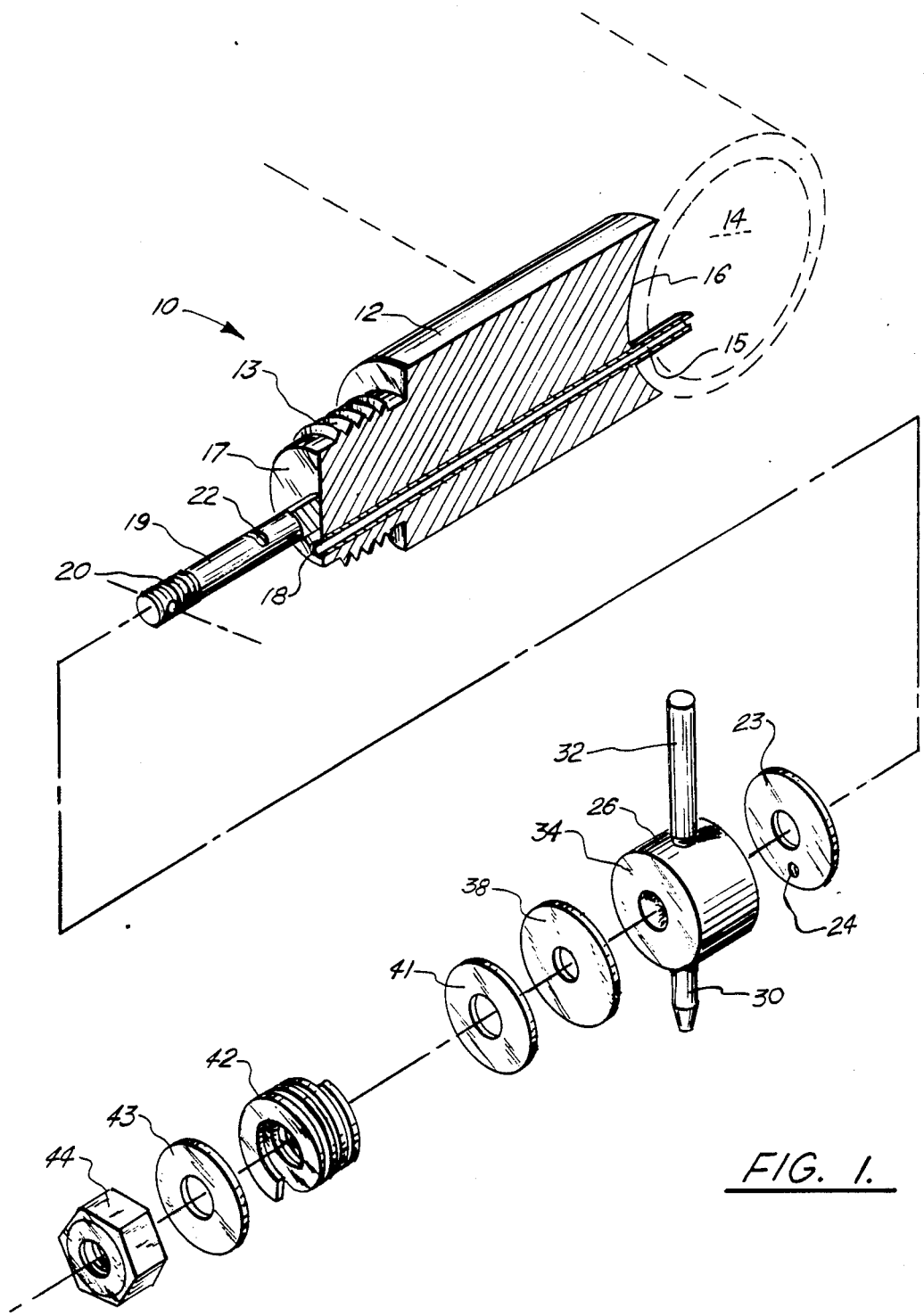
FIG. 1 is a perspective partial cut-away exploded view of the preferred embodiment of the apparatus of the present invention.

FIGS. 1 through 5 illustrate the preferred embodiment of the apparatus of the present invention generally designated by number 10. Apparatus 10 would comprise elongated valve body 12 which would be a substantially solid core, steel valve body preferably 3 to 4 inches in length, depending on the volume therein, for mounting within main flow line 14. Normally main flow line 14 would be a flow line contained within a chemical plant or the like for transporting homogeneous fluids normally under high pressure, during chemical processes. As seen in FIG. 1, valve body 12 would have a flow line 15 through its entire length, extending from the innermost end portion 16 of valve body 12, with flow line 15 preferably extending approximately one-half to one inch within main flow line 14, with the opening of line 15 for receiving fluids being substantially perpendicular to the fluid flow within main line 14. This would provide for the homogeneous collection of fluids flowing through main flow line 14 during the sampling process. Flow line 15 would extend through valve body 12 to the outer end portion 17 of valve body 12 for conveying fluids exterior to valve body 12 at point 18. It should be noted that fluids would flow through line 15 due to the pressure under which the fluid is flowing within flow line 14. Therefore, normally, the fluids within flow bore 15 would be under pressure. It should be noted, as is illustrated in FIG. 1, that the outer end of flow bore 15 extrudes past the face 17 of valve body 12 approximately 0.10 centimeters, the function of which will be described further. Valve body 12 also is adapted with threaded area 13 for accommodating a isolation cap 50, the function of which is described further.

Valve apparatus 10 also comprises a valving means for allowing and disallowing fluid flow through the apparatus. This means would generally comprise stem member 19, as seen in FIG. 1, which extrudes from the center of valve body 12, at face 17. Stem member 19 is further provided on its furtherestmost end with threaded portion 20, and recessed track 22, the functions of which will be described further. There is further provided a first sealing means or teflon member 23, which, in the preferred embodiment, would contain a port 24 for aligning with flow line 15, and allowing flow into a rotatable collar 26. Wafer 23 would effect a fluid-tight seal against face 17 upon use of the apparatus.

Figure 2:
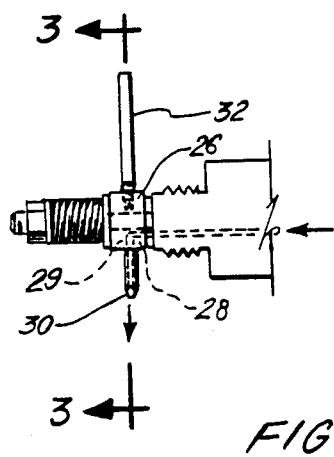
FIG. 2 is a partial side view of the preferred embodiment of the apparatus of the present invention.

Immediately adjacent to wafer 15 is rotatable collar member 26 which is generally a thickened collar rotatably and concentrically mounted on stem member 19, then, as is seen in FIG. 2, having a lateral flow bore 28 in fluid communication with a vertical flow bore 29, the two bores defining a continuous flow bore within collar 26 extending and allowing fluid flow, in the open position, from flow bore 15 downwardly into spout 30. Collar member 26 further includes handle member 32, which, preferably would be mounted directly opposite spout 30, and would be a means for rotating collar member 26 from the open to closed positions during the use of the valve. As is seen from the figures, handle 32 is threadably engaged into the wall of collar 26, with the threaded end portion 33 of handle 32 extending to engage into recessed track 22. Therefore, upon rotating collar member 26, the rotation would be permitted within track 22 as best seen in FIGS. 3 and 4, with the end portions 35 and 36 of track 22 defining first and second stop means when collar member 26 is rotated between open and closed positions.

Figure 3:
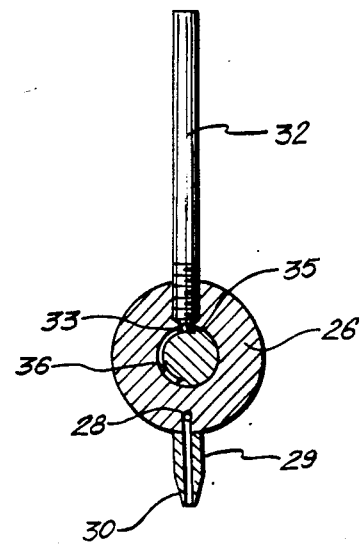
FIG. 3 is a front cut-away view taken along lines 3—3 of FIG. 2 of the preferred embodiment of the apparatus of the present invention.
Figure 4:
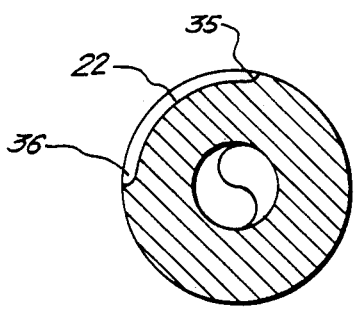
FIG. 4 is a cross-sectional view of the valve body of the preferred embodiment of the apparatus of the present invention illustrating the stop means of the apparatus.

As seen in FIG. 3, preferably, upon rotation of collar member 26 wherein handle 32 would engage stop 35, lateral flow bore 28 would be aligned directly with flow bore 15, thus placing the valve in the "open" position for allowing the fluid flow from spout 30 into a collection apparatus or the like. Likewise, upon rotation of collar member 26 in the opposite direction until handle member engages stop 36, flow bore 28 and flow bore 15 are misaligned, and thus the valve is in the "closed" position with fluid flow blocked from entering spout 30 by teflon wafer 23.

As seen in the figures, following the placement of collar member 26 upon stem 19, there is further provided a second preferably teflon wafer 38 which is mounted against face 39 of collar member 26, and in fluid-tight engagement therewith. Following the placement of washer 38, there is provided, preferably metal washer 41 in face-to-face relationship with teflon washer 38, with washer 41 providing a metal surface for accommodating spring 42 which would also be mounted adjacent and in contact with washer 41. There is then provided a second washer 43 and nut 44, the nut 44 threadably engaging threads 20 of stem 19. As was stated earlier, upon mounting nut 44 on stem 20, spring 42 would exert pressure between washers 23, 38 and collar member 26 to effect a fluid-tight seal and maintain a shutdown in fluid flow when the valve is in the closed position.

Figure 5:
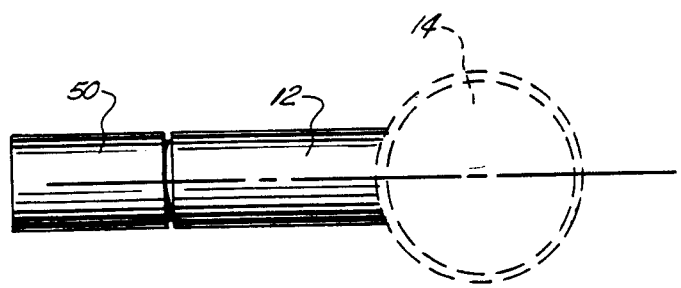
FIG. 5 is a top view of the preferred embodiment of the apparatus of the present invention illustrating an isolation cap placed thereupon.

It should be noted in the preferred embodiment that teflon wafer 23, in view of the fact that the very end portion of fluid flow bore 15 extrudes into port 24, would be a stationary wafer, and would not rotate as collar member 26 is rotated from the open to the closed positions. However, it should be noted that wafers 38 and 41 could conceivably rotate with collar member 26 during the opening and closing of valve 10 during the sampling process. As seen in FIG. 3, in view of the fact that spout 30 and handle 32 are rotatably engaged into valve body 12, there could be provided, as seen in FIG. 5, an isolation cap member 50 which would threadably engage threaded portion 13 of valve body 12, for complete isolation of the valve should leaks or failure occur.

Figure 6:
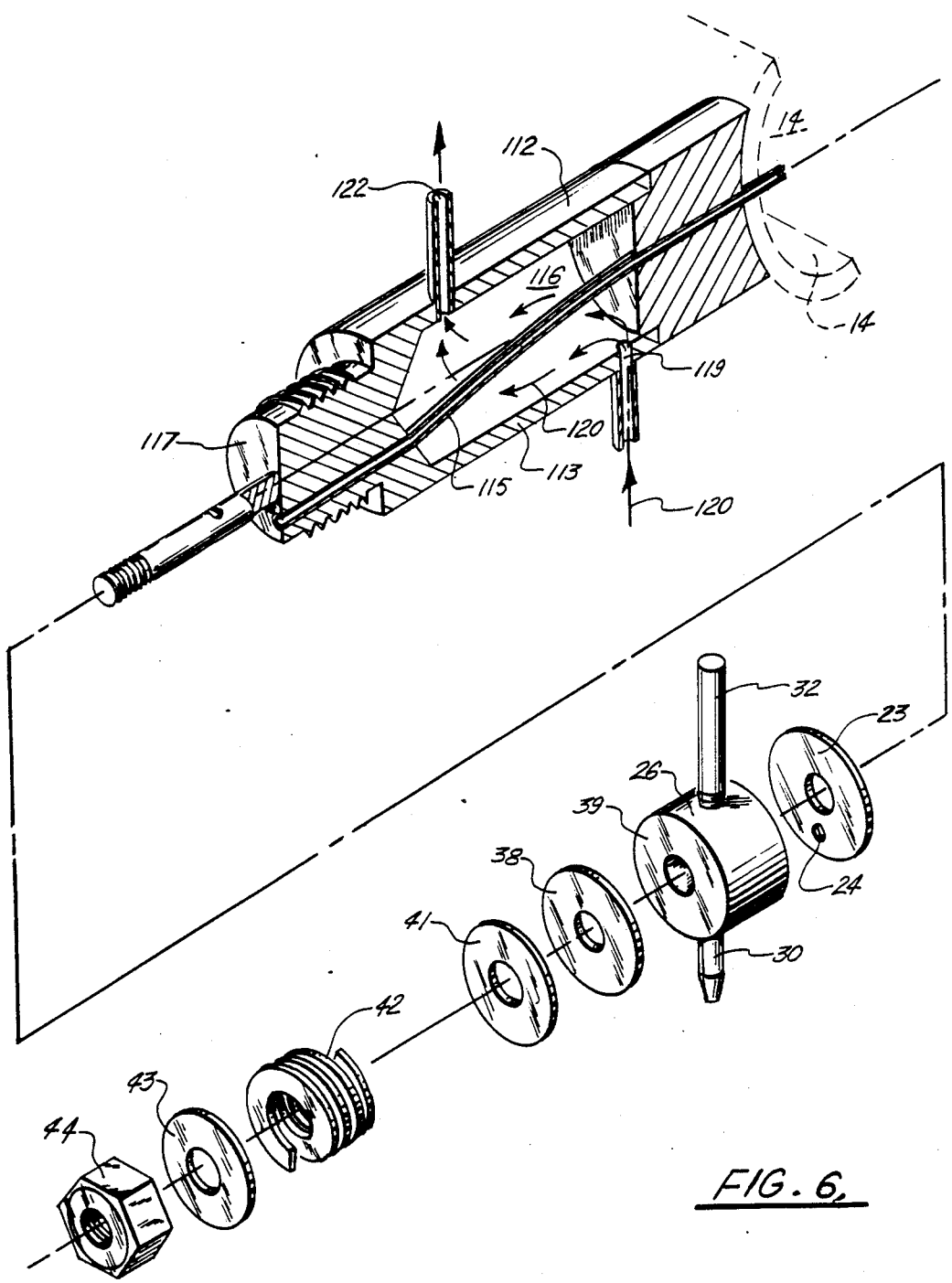
FIG. 6 is a perspective exploded partial cut-away view of an additional embodiment of the apparatus of the present invention.

In a second embodiment of the apparatus, as seen in FIG. 6, likewise there would be provided the components which make up the preferred embodiment, i.e., a valve body, a flow bore therethrough, a stem member extruding from the end face portion of the valve body, for rotatably mounting thereupon the items as seen in FIG. 1 for effecting and an open and closing valve apparatus. However, unlike the preferred embodiment, the embodiment as illustrated in FIG. 6, would have a valve body 112, which would comprise a continuous wall portion 113 for engaging main flow line 14, having a flow line 115 extending between flow line 14 and the end portion 117 of valve body 112. Valve body 112 would generally be a hollowed out valve body having a continuous wall portion 113 defining a plenum chamber with flow line 115 running therethrough. Therefore, there would be a main plenum chamber 116 between the inner wall of body 112 and the flow line 115. As seen in the figures, there is further provided an inlet port 119 wherein a coolant such as water or the like as illustrated by arrow 120 could enter plenum chamber 116, and flow out of exit port 122 on a continuing basis. This combination would generally define a heat exchange means wherein fluid flow contained within line 115, were in under extreme heat would lose some of its heat to the surrounding coolant flow 120, and thus could be sampled at a reduced temperature after flowing through coolant chamber or 116. The reverse is also true where heat can be applied in the form of steam or the like for insuring that the fluid state within the sample stream is of molten liquid state. In operation, however, the fluid flowing within line 115 would be extracted or sampled from the apparatus in the same method and utilizing the same means as would the preferred embodiment of the apparatus.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A valve for sampling homogeneous fluids within a flow line, which comprises:
   a. a valve body mounted on the flow line and having a conduit with a bore therethrough with a first end of the conduit receiving fluid flow from the flow line, and a second end of the conduit having a flat face portion;
   b. a valving member rotatably mounted on the valve body, movable from a first position allowing fluid communication between the valving member and the conduit in the valve body to a second position blocking fluid communication;
   c. a stationary sealing wafer positioned intermediate a face of the valve body and a face of the valving member, the stationary wafer having a flow bore therethrough aligned with the flow bore of the conduit;
   d. means exerting a force on the valving member in the direction of the valve body to effect a pressure seal between the face of the stationary sealing wafer and the face of the valving member so that when the valving member is moved to the second position a fluid tight seal is established between the valving member and the conduit in the valve body; and
   e. port means for allowing fluid flow to exit the valving member when the valving member is moved to the first position.

2. The apparatus in claim 1, wherein the bore of the valve body opens to the flow line gernerally perpendicular to the flow within the flow line.

3. The apparatus in claim 1, wherein said means exerting force on the valving member further comprises a spring member for maintaining the valving member in fluid tight engagement against the face of the stationary wafer when the valving member is moved between the first and second positions.

4. The apparatus in claim 1, further comprising stop means for stopping the movement of the valving means when when the valving means has moved to the first position or to the second position.

5. The apparatus in claim 1, further comprising isolation means for selectively isolating the valve to prevent exterior contamination.

6. The valving member of claim 1, further comprising:
   a. a stem member extruding from the valve body; and
   b. collar means rotatably mounted on the stem member, the collar means further comprising a port alignable with the port on said valve body when the collar means is in a first position for directing a stream of collected fluid perpendicular to the flow of the fluid stream within the valve body.

7. The appartus in claim 1, wherein the stationary sealing wafer continues to effect a seal between the face of the sealing member and the face of the valving member when the valving member is in the second position except for fluid flow through the conduit into the valving member.

8. The apparatus in claim 7, further comprising an isolation member mounted on the exterior of the valve body for isolating the valve body for preventing contamination should a leak occur in the valve body.

9. The apparatus in claim 7, wherein the flow bore in the fluid line is opened perpendicular to the flow in the flow line.

10. A valve for sampling high pressure homogeneous fluids within a flow line, which comprises:
   a. a valve body mounted generally perpendicular to the flow within the flow line and having a conduit with a bore therethrough, a first end of the conduit receiving fluid from the flow line, and a second end of the conduit projecting externally from a face of the valve body in fluid communication with the fluid flow in the flow line;
   b. a valving member having a fluid flow bore therethrough, movable between a first position where the fluid flow bore in the valving member is coxially aligned with the fluid flow bore in the conduit, allowing fluid flow therethrough, and to a second position, where the flow bore of the valving member is misaligned with the fluid flow bore in the conduit for blocking fluid communication between the valve body and the valving member;
   c. a sealing wafer maintained in a stationary position intermediate a face of a valve body and the face of the valving member by the projecting end of the conduit, the stationary wafer having a flow bore therethrough aligned with the flow bore of the conduit; and
   d. spring means exerting force for biasing the valving member in fluid-tight engagement against the face of the stationary sealing wafer when the valving member is in the second position so that the force exerted against the face of the stationary sealing wafer effects a pressure seal around the projecting end of the conduit to block fluid flow from the conduit, and when the valving member is in the first position allowing fluid flow through the conduit into the valving member, yet maintaining a seal between the face of the valving member and the face of the stationary valving member.

11. A valve for sampling homogeneous fluids within a flow line, which comprises:
   a. a valve body mounted on the flow line and having a conduit with a bore therethrough in fluid communication with the flow line for receiving fluid flow from the flow line, the conduit projecting externally of a face valve body;
   b. a valving member rotatably mounted on the valve body, movable from a first position allowing fluid communication between the valve body and the valving member to a second position blocking fluid communication;
   c. a wafer having a flow openining aligned with the flow opening in the conduit, the wafer maintained in a stationary sealing position intermediate a face of the valve body and a face of the valving member by the projecting end of the conduit;
   d. means for exerting force between the face of the valving member and the face of the stationary member to effect a pressure fluid seal around the projecting end of the conduit for preventing any fluid flow out of the conduit when the valving member has been rotated to the second position and for preventing any fluid flow to the exterior of the valve when the valving member has been rotated to the first position; and
   e. port means for allowing fluid flow to exit the valving means when the valving member is moved to the first position.

12. The apparatus in claim 11, further comprising heat exchange means, including a plenum chamber surrounding the fluid flow bore conduit within the valve body for accommodating a second fluid flow therethrough in heat exchange relationship with the fluid flow bore conduit in the valve body.

* * * * *